Oct. 13, 1925.
J. P. WALKER
PROCESS OF MAKING METAL CONTAINERS
Filed Nov. 1, 1924
1,556,651
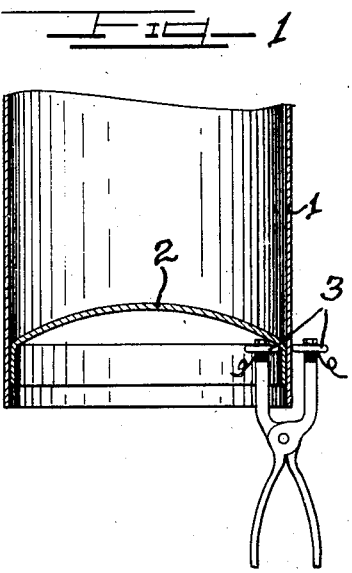
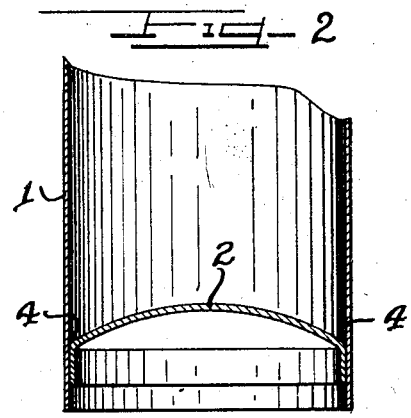
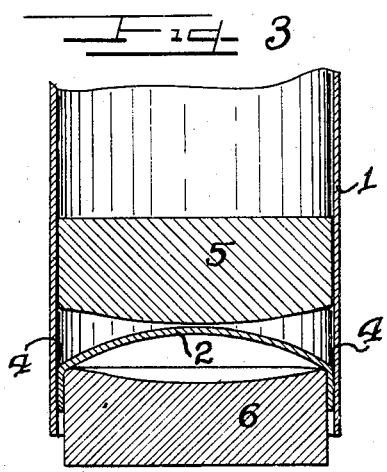
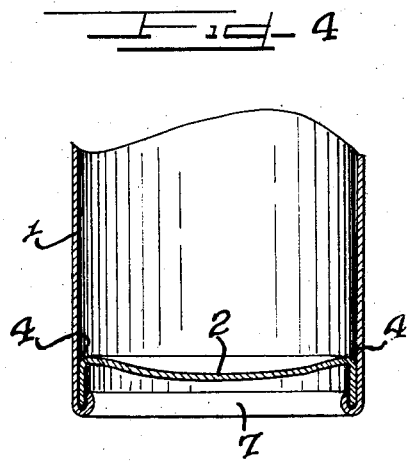
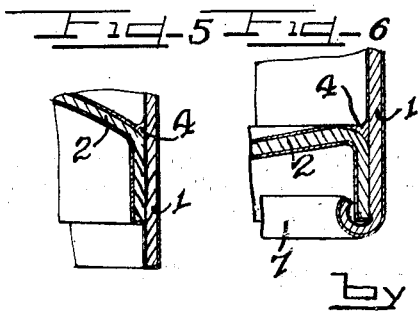
Inventor
James P Walker
by
Attys.

Patented Oct. 13, 1925.

1,556,651

UNITED STATES PATENT OFFICE.

JAMES P. WALKER, OF CHICAGO, ILLINOIS, ASSIGNOR TO SOLAR-STURGES MFG. CO., A CORPORATION OF ILLINOIS.

PROCESS OF MAKING METAL CONTAINERS.

Application filed November 1, 1924. Serial No. 747,311.

*To all whom it may concern:*

Be it known that I, JAMES P. WALKER, a citizen of the United States, and a resident of the city of Chicago, in the county of Cook and State of Illinois, have invented certain new and useful Improvements in a Process of Making Metal Containers; and I do hereby declare that the following is a full, clear, and exact description of the same, reference being had to the accompanying drawings, and to the numerals of reference marked thereon, which form a part of this specification.

This invention relates to metal cans in general and more particularly to that class of cylindrical cans such as ice cream cans in which it is desirable to secure a separately formed bottom to the can and the method of manufacture of the same.

Prior to this time cans have been manufactured in which the bottoms were applied to the can by welding but said bottoms were not as satisfactory as might be due to the impracticability of reaching the uppermost point of the juncture between the bottom and the can with the welding terminals.

It is therefore an object of this invention to provide a metal can and the method of manufacture of the same in which welding terminals may be used to weld the uppermost point of the juncture between the bottom and the can.

It is further an important object of this invention to provide a metal can and the method of manufacture of the same in which the can is, in effect, seamless as presented to the inside of the can at the juncture of the bottom and the can.

It is also an important object of this invention to provide a metal can and the method of manufacture of the same which is simple and inexpensive.

Other and further important objects of this invention will be apparent from the disclosures in the specification and the accompanying drawings.

The invention (in a preferred form) is illustrated in the drawings and more fully described hereinafter.

On the drawings:

Figure 1, a vertical section, shows the bottom inserted in the can and the electric welding terminals in position for operation.

Figure 2, a vertical section, shows the can after having been welded and dipped.

Figure 3, a vertical section, shows the dies in position for stamping the bottom.

Figure 4, a vertical section, shows the finished can.

Figure 5 is a detail view of Figure 2.

Figure 6 is a detail view of Figure 4.

As shown on the drawings:

Reference numeral 1 represents the cylindrical can which is formed in a suitable manner and which receives at its lower end a bottom 2 which has been stamped into the form of an inverted dish having a bulged upper portion and depending sides forming a flange which fits closely against the inside of said cylindrical member 1. Welding terminals upon which are rollers 3 are then inserted as far as the uppermost point of the flange forming the juncture between the bottom member 2 and the can 1 and said members 1 and 2 are welded by continuous spot welding throughout the entire circumference of said flange or juncture. The can is then dipped in a bath of molten metal adapted for coating such as tin. A film of the coating metal will remain on the inner surface of the sides and bottom of the can but the excess will run down the inside and form a fillet 4 closing up the seam where the bottom 2 joins the sides 1 of the can and also at the lower edge of the flange. Die members 5 and 6 adapted to bulge the bottom 2 downwardly are then inserted into either end of the can as shown and compressed. The lower edge of the cylinder 1 is then turned up over the lower edge of the depending flange of the bottom 2 as shown at 7 in Figures 4 and 6.

It will be seen that a can is obtained which is simple and inexpensive. It will also be apparent that due to the fact that the member 2 is initially bulged upwardly but not bulged downwardly until after the welding operation, the welding rollers 3 are able to extend well up to and to cover a larger area of the juncture between the bottom and sides of the can than would otherwise be the case. It will further be evident that since the can is dipped in the coating metal prior to bulging down the bottom the fillet 4 is enabled to rise higher than would otherwise be the case, which makes the inside of the can, in effect, seamless.

I am aware that numerous details of construction may be varied through a wide range without departing from the principles of this invention, and I therefore do not purpose limiting the patent granted otherwise than necessitated by the prior art.

I claim as my invention:

1. The method of applying a bottom to a receptacle consisting in, initially forming the bottom member with an upward dish and a depending flange, inserting said member in the receptacle, welding said member to the receptacle along the line where the flange and dish portions of the bottom member meet, and then dishing the bottom member downwardly relative to the receptacle.

2. The method of applying a bottom to a receptacle consisting in, initially forming the bottom member with an upward convex dish and a depending flange, inserting said member in the receptacle, welding said member to the receptacle along the line where the flange and dished portions of the bottom member meet and then dishing said bottom member downwardly.

3. The method of applying a bottom to a receptacle consisting in, initially forming the bottom member with an upward convex dish and a depending flange, welding said bottom into the body along the top of the said flange, coating said secured members with a coating material, allowing it to form a fillet along the inner seam of the juncture of said members, and then dishing said bottom member downwardly relative to said receptacle.

4. The method of applying a bottom to a receptacle consisting in initially forming the bottom member with an upward convex dish and a depending flange, continuously spot welding said member to the receptacle along the line where the flange and dished portions of the bottom member meet, coating said secured members with block tin allowing it to form a fillet along the inner seam of the juncture of said members, then dishing said bottom member downwardly relative to said receptacle by means of suitable dies, and sealing the lower edge of the flange to the can body.

5. The method of applying a bottom to a receptacle consisting in, initially forming the bottom member with an upward convex dish and a depending flange, continuously welding said members along the upper edge of said flange, coating said secured members within and without with a block tin allowing the tin to form a fillet along the inner seam of the juncture of said members, and then dishing said bottom member downwardly by means of suitable dies to afford a concave bottom.

6. The method of applying a bottom to a cylindrical sheet metal receptacle consisting in, initially and separately forming the bottom member with an upward convex dish and a depending flange, inserting and securing said bottom in the receptacle by welding said flange to said receptacle along the top of the flange, coating said secured members within and without with a block tin whereby a fillet of tin is provided along the inner seam of the juncture of said member, then dishing the bottom to afford a concave dish extending to near the side wall, then beading the lower end of the receptacle inwardly and sealing the lower seam of the flange to the body.

In testimony whereof I have hereunto subscribed my name.

JAMES P. WALKER.